US012753923B2

(12) United States Patent
Pet T et al.

(10) Patent No.: US 12,753,923 B2
(45) Date of Patent: Oct. 6, 2026

(54) GAS TURBINE ENGINE INCLUDING HYDROGEN-COMPATIBLE FUEL-AIR MIXER WITH MULTI-JET MIXING TUBE

(71) Applicant: GENERAL ELECTRIC COMPANY, Evendale, OH (US)

(72) Inventors: Prithiviraaj Pet T, Madurai (IN); Karthikeyan Sampath, Bengaluru (IN); Pradeep Naik, Bengaluru (IN); Pabitra Badhuk, Jhargram (IN); Aritra Chakraborty, Kolkata (IN); Sibtosh Pal, Mason, OH (US); Michael A. Benjamin, Cincinnati, OH (US); Michael T. Bucaro, Arvada, CO (US)

(73) Assignee: GENERAL ELECTRIC COMPANY, Evendale, OH (US)

( * ) Notice: Subject to any disclaimer, the term of this patent is extended or adjusted under 35 U.S.C. 154(b) by 0 days.

(21) Appl. No.: 18/978,161

(22) Filed: Dec. 12, 2024

(65) Prior Publication Data

US 2026/0168674 A1 Jun. 18, 2026

(51) Int. Cl.
*F23R 3/28* (2006.01)
*F02C 3/22* (2006.01)
(Continued)

(52) U.S. Cl.
CPC ................ *F23R 3/286* (2013.01); *F02C 3/22* (2013.01); *F23R 3/002* (2013.01); *F02C 7/22* (2013.01)

(58) Field of Classification Search
CPC .... F23R 3/14; F23R 3/286; F02C 3/22; F02C 7/22
See application file for complete search history.

(56) References Cited

U.S. PATENT DOCUMENTS

| | | | | |
|---|---|---|---|---|
| 6,684,640 | B2 | 2/2004 | McMillan et al. | |
| 8,590,311 | B2 * | 11/2013 | Parsania | F23R 3/286 60/737 |

(Continued)

FOREIGN PATENT DOCUMENTS

| | | | |
|---|---|---|---|
| CN | 113217196 | A | 8/2021 |
| CN | 114877373 | A | 8/2022 |

(Continued)

OTHER PUBLICATIONS

Extended European Search Report for Application No. 25216483.5 dated Mar. 31, 2026, 9 pages.

*Primary Examiner* — William H Rodriguez
(74) *Attorney, Agent, or Firm* — Carter, DeLuca & Farrell, LLP

(57) ABSTRACT

A gas turbine engine, comprising: a compressor section, a combustion section, and a turbine section in a serial flow arrangement, with the combustion section comprising: a combustor liner that at least partially defines a combustion chamber; and a fuel-air mixer fluidly coupled with the combustion chamber and comprising: a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air; a first set of air jets fluidly coupled with the mixing channel and axially spaced downstream of the mixing tube inlet; and a second set of air jets fluidly coupled with the mixing channel and axially spaced downstream of the first set of air jets.

18 Claims, 10 Drawing Sheets

(51) Int. Cl.
*F23R 3/00* (2006.01)
*F02C 7/22* (2006.01)

(56) References Cited

U.S. PATENT DOCUMENTS

| | | | | |
|---|---|---|---|---|
| 10,969,107 | B2 | 4/2021 | Rickey et al. | |
| 11,378,277 | B2 * | 7/2022 | Joshi | F02C 3/14 |
| 11,506,388 | B1 * | 11/2022 | Boardman | F23R 3/343 |
| 11,592,182 | B1 * | 2/2023 | Rangrej | F23D 11/105 |
| 11,692,709 | B2 * | 7/2023 | Naik | F23R 3/286 60/737 |
| 12,111,057 | B2 * | 10/2024 | Naik | F23R 3/343 |
| 2006/0127827 | A1 * | 6/2006 | Yoshida | F23C 7/004 431/18 |
| 2007/0277528 | A1 * | 12/2007 | Homitz | F23D 14/58 60/737 |
| 2009/0115190 | A1 * | 5/2009 | Devine | C25B 9/70 204/554 |
| 2010/0162710 | A1 * | 7/2010 | Senior | F23R 3/34 60/737 |
| 2011/0016866 | A1 | 1/2011 | Boardman et al. | |
| 2013/0186057 | A1 * | 7/2013 | Shanmugam | F23R 3/36 60/776 |
| 2014/0238025 | A1 | 8/2014 | Uhm et al. | |
| 2018/0128489 | A1 * | 5/2018 | Boardman | F23R 3/10 |
| 2018/0128490 | A1 * | 5/2018 | Boardman | F23R 3/283 |
| 2019/0107053 | A1 | 4/2019 | Miyamoto et al. | |
| 2019/0212009 | A1 * | 7/2019 | Boardman | F23R 3/58 |
| 2019/0271470 | A1 * | 9/2019 | Boardman | F23R 3/283 |
| 2020/0158343 | A1 * | 5/2020 | Boardman | F23R 3/18 |
| 2020/0263873 | A1 * | 8/2020 | Boardman | F02C 7/22 |
| 2022/0243915 | A1 * | 8/2022 | Rich | F23R 3/20 |
| 2022/0290863 | A1 * | 9/2022 | Naik | F23R 3/12 |
| 2022/0357038 | A1 | 11/2022 | Boardman et al. | |
| 2023/0003385 | A1 | 1/2023 | Naik et al. | |
| 2023/0089261 | A1 | 3/2023 | Cho et al. | |
| 2023/0204214 | A1 * | 6/2023 | Giridharan | F23R 3/286 |
| 2023/0266009 | A1 * | 8/2023 | Naik | F23R 3/286 60/737 |
| 2023/0272911 | A1 * | 8/2023 | Chon | F23R 3/283 60/746 |
| 2023/0288069 | A1 * | 9/2023 | Naik | F23R 3/286 |
| 2024/0085024 | A1 | 3/2024 | Engelhardt | |
| 2024/0263581 | A1 * | 8/2024 | McCaldon | F02C 7/222 |

FOREIGN PATENT DOCUMENTS

| | | | | |
|---|---|---|---|---|
| CN | 115355536 | A | 11/2022 | |
| EP | 3719396 | A1 | 10/2020 | |
| WO | WO-2024172924 | A2 * | 8/2024 | F02C 7/143 |

* cited by examiner

GAS TURBINE ENGINE INCLUDING HYDROGEN-COMPATIBLE FUEL-AIR MIXER WITH MULTI-JET MIXING TUBE

TECHNICAL FIELD

The present subject matter relates generally to a gas turbine engine having a fuel-air mixer.

BACKGROUND

Turbine engines are driven by a flow of combustion gases passing through the engine to rotate a multitude of turbine blades, which, in turn, rotate a compressor to provide compressed air to the combustor for combustion. A combustor can be provided within the turbine engine and is fluidly coupled with a turbine into which the combusted gases flow.

Historically, hydrocarbon fuels are used in the combustor of a turbine engine. Generally, air and fuel are fed to a combustion chamber, the air and fuel are mixed, and then the fuel is burned in the presence of the air to produce hot gas. The hot gas is then fed to a turbine where it cools and expands to produce power. By-products of the fuel combustion typically include environmentally unwanted byproducts, such as nitrogen oxide and nitrogen dioxide (collectively called $NO_x$), carbon monoxide (CO), unburned hydrocarbons (UHC) (e.g., methane and volatile organic compounds that contribute to the formation of atmospheric ozone), and other oxides, including oxides of sulfur (e.g., $SO_2$ and $SO_3$).

To reduce the environmentally unwanted byproducts, other fuels, such as hydrogen, are being explored. Hydrogen or hydrogen mixed with another element has a higher flame temperature than traditional hydrocarbon fuels. That is, hydrogen or a hydrogen mixed fuel typically has a wider flammable range and a faster burning velocity than traditional hydrocarbon-based fuels.

DETAILED DESCRIPTION

Figure 1:
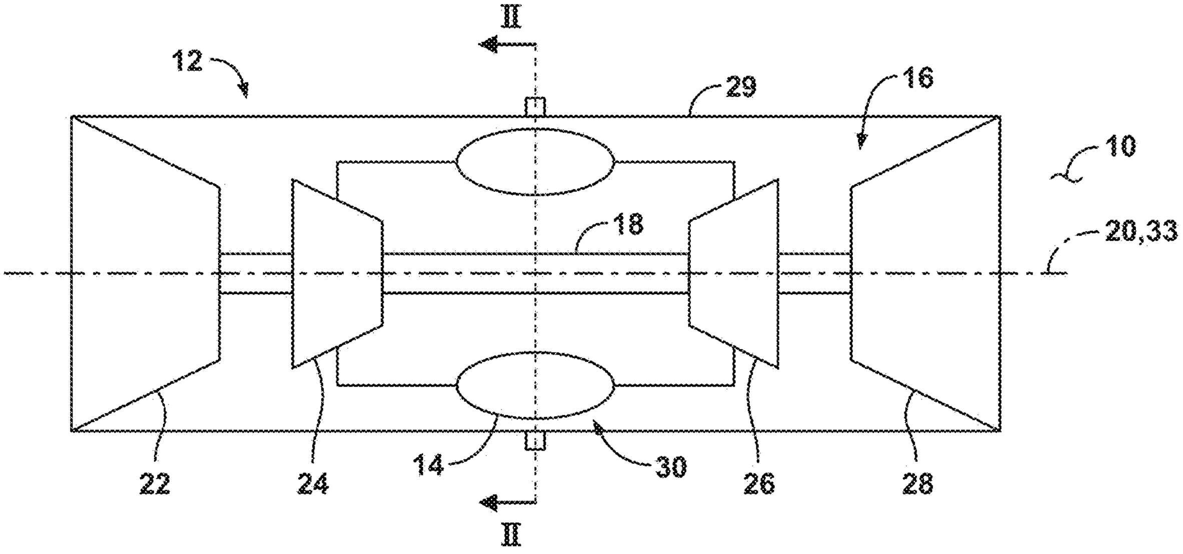
FIG. 1 is a schematic view of a gas turbine engine having a compression section, a combustion section, and a turbine section in accordance with various aspects described herein.

Aspects of the disclosure described herein are directed to a combustor. With some aspects, the disclosed combustors and fuel-air mixer assemblies can be utilized with gaseous fuel, such as hydrogen. Gaseous fuel, including hydrogen, spreads/disperses at a faster rate than atomized liquid fuel, which can involve less mixing time for the gaseous fuel, shorter fuel mixing tube lengths, and the flame from the gaseous fuel may be more likely to spread farther and faster, which can increase the risk of flashback and flame holding (e.g., in a mixer), and increase the impact of controlling the flame and limiting flame spread by controlling the dispersion of the gaseous fuel.

Fuel-air mixers can utilize double pressure drop, low velocity air introduced along with axial fuel into a mixing channel. Air can then be impinged radially on the fuel via radial air jets, at one or more axial positions, to laterally spread the fuel. Tangential air jets are provided at different axial positions from the radial jets, to engage swirl and rotate the laterally spread fuel, which can spread the fuel without separating the fuel. Utilizing double pressure drop, low velocity air can reduce the possibility of wake formations behind radial jets, which can limit flashback and flame holding.

Many other possible aspects and configurations in addition to those shown in the included figures are contemplated by the present disclosure. The disclosed fuel-air mixers can provide greater flame stability, wider operability, lower flame temperatures, reduced flashback, reduced flame holding, reduced autoignition possibilities, and lower $NO_x$ emissions relative to other designs. Limiting flashback, autoignition, and flame holding can allow for use of more reactive fuels, such as hydrogen, facilitate the use of more reactive fuels by limiting wear to engine components, or both. Increased mixing and lateral spreading of fuel can provide more uniform temperature distribution and lower maximum temperatures, which can limit $NO_x$ emissions.

For purposes of illustration, the present disclosure will be described with respect to a turbine engine. It will be understood, however, that aspects of the disclosure described herein are not so limited. A combustor as described herein can be implemented in various engines, including but not limited to turbojet, turboprop, turboshaft, and turbofan engines. Aspects of the disclosure discussed herein may have general applicability within non-aircraft engines having a combustor, such as other mobile applications and non-mobile industrial, commercial, and residential applications.

With the combustors and fuel nozzle assemblies described herein, gaseous hydrogen fuel can be used without the need of diluents. In some embodiments, no diluent is added to the combustion chamber and the fuel is substantially completely diatomic hydrogen without diluent. As used herein, the term "substantially completely," is used to describe the amount of a particular element or molecule (e.g., diatomic hydrogen), refers to at least 99% by mass of the described portion of the element or molecule, such as at least 97.5%, such as at least 95%, such as at least 92.5%, such as at least 90%, such as at least 85%, or such as at least 75% by mass of the described portion of the element or molecule. In some examples, the fuel is entirely (e.g., 100%) hydrogen by mass.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The terms like "first", "second", etc. may be used interchangeably to distinguish one component from another and are not intended to signify location or importance of the individual components.

The terms "forward" and "aft" refer to relative positions within a gas turbine engine or vehicle and refer to the normal operational attitude of the gas turbine engine or vehicle. For example, with regard to a gas turbine engine, forward refers to a position closer to an engine inlet and aft refers to a position closer to an engine exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

The term "fluid" may be a gas or a liquid. The term "fluidly coupled" means that a fluid is capable of making the connection between the areas specified.

The term "nozzle" has been used in various ways in the context of gas turbine engines. In the instant application, "nozzle" refers to a component having a portion for fluid coupling to a fuel supply and having at least one portion for fluidly coupling with a combustor portion, a combustor liner, a combustion chamber, or combinations thereof.

Additionally, as used herein, the terms "radial" or "radially" refer to a direction away from a common center. For example, in the overall context of a turbine engine, radial refers to a direction along a ray extending between a center longitudinal axis of the engine and an outer engine circumference.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only, and the dimensions, positions, order, and relative sizes reflected in the drawings attached hereto can vary.

The singular forms "a", "an", and "the" include plural references unless the context clearly dictates otherwise. Furthermore, as used herein, the term "set" or a "set" of elements can be any number of elements, including only one.

Uses of "and" and "or" are to be construed broadly. For example, and without limitation, uses of "and" do not necessarily require all elements or features listed, and uses of "or" are inclusive unless such a construction would be illogical.

Approximating language, as used herein throughout the specification and claims, is applied to modify any quantitative representation that could permissibly vary without resulting in a change in the basic function to which it is related. Accordingly, a value modified by a term or terms, such as "about", "approximately", "generally", and "substantially", are not to be limited to the precise value specified. In at least some instances, the approximating language may correspond to the precision of an instrument for measuring the value, or the precision of the methods or machines for constructing or manufacturing the components and systems. In at least some instances, the approximating language may correspond to the precision of an instrument for measuring the value, or the precision of the methods or machines for constructing or manufacturing the components and systems. For example, the approximating language may refer to being within a 1, 2, 4, 5, 10, 15, or 20 percent margin in either individual values, range(s) of values and endpoints defining range(s) of values. Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

"Proximate" as used herein is a descriptor for locating parts described herein. Further, the term "proximate" means nearer or closer to the part recited than the following part. For example, a first aperture proximate a wall, the first aperture located upstream from a second aperture means that the first aperture is closer to the wall than the first aperture is to the second aperture.

Additionally, as used herein, a "controller" can include a component configured or adapted to provide instruction, control, operation, or any form of communication for operable components to effect the operation thereof. A controller can include any known processor, microcontroller, or logic device, including, but not limited to: field programmable gate arrays (FPGA), an application specific integrated circuit (ASIC), a full authority digital engine control (FADEC), a proportional controller (P), a proportional integral controller (PI), a proportional derivative controller (PD), a proportional integral derivative controller (PID controller), proportional resonant controller (PR), a hardware-accelerated logic controller (e.g. for encoding, decoding, transcoding, etc.), the like, or a combination thereof. Non-limiting examples of a controller can be configured or adapted to run, operate, or otherwise execute program code to effect operational or functional outcomes, including carrying out various methods, functionality, processing tasks, calculations, comparisons, sensing or measuring of values, or the like, to enable or achieve the technical operations or operations described herein. The operation or functional outcomes can be based on one or more inputs, stored data values, sensed or measured values, true or false indications, or the like. While "program code" is described, non-limiting examples of operable or executable instruction sets can include routines, programs, objects, components, data structures, algorithms, etc., that have the technical effect of performing particular tasks or implement particular abstract data types. In another non-limiting example, a controller can also include a data storage component accessible by the processor, including memory, whether transient, volatile or non-transient, or non-volatile memory.

Additional non-limiting examples of the memory can include Random Access Memory (RAM), Read-Only Memory (ROM), flash memory, or one or more different types of portable electronic memory, such as discs, DVDs, CD-ROMs, flash drives, universal serial bus (USB) drives, the like, or any suitable combination of these types of memory. In one example, the program code can be stored within the memory in a machine-readable format accessible by the processor. Additionally, the memory can store various data, data types, sensed or measured data values, inputs, generated or processed data, or the like, accessible by the processor in providing instruction, control, or operation to effect a functional or operable outcome, as described herein. In another non-limiting example, a controller can be configured for comparing a first value with a second value and operating and controlling operations of additional components based on the satisfying of that comparison. For example, when a sensed, measured, or provided value is compared with another value, including a stored or predetermined value, the satisfaction of that comparison can result in actions, functions, or operations controllable by the controller.

FIG. 1 is a schematic view of a gas turbine engine 10. As a non-limiting example, the gas turbine engine 10 can be used within an aircraft. The gas turbine engine 10 can include, at least, a compressor section 12, a combustion section 14, and a turbine section 16 in a serial flow arrangement. A drive shaft 18 rotationally couples the compressor section 12 and turbine section 16, such that rotation of one affects the rotation of the other and defines a rotational axis 20 for the gas turbine engine 10.

The compressor section 12 can include a low-pressure (LP) compressor 22, and a high-pressure (HP) compressor 24 serially fluidly coupled to one another. The turbine section 16 can include an HP turbine 26, and an LP turbine 28 serially fluidly coupled to one another. The drive shaft 18 can operatively couple the LP compressor 22, the HP compressor 24, the HP turbine 26 and the LP turbine 28 together. Alternatively, the drive shaft 18 can include an LP drive shaft and an HP drive shaft. The LP drive shaft can couple the LP compressor 22 to the LP turbine 28, and the HP drive shaft can couple the HP compressor 24 to the HP turbine 26. An LP spool can be defined as the combination of the LP compressor 22, the LP turbine 28, and the LP drive shaft such that the rotation of the LP turbine 28 can apply a driving force to the LP drive shaft, which in turn can rotate the LP compressor 22. An HP spool can be defined as the combination of the HP compressor 24, the HP turbine 26, and the HP drive shaft such that the rotation of the HP turbine 26 can apply a driving force to the HP drive shaft which in turn can rotate the HP compressor 24.

The compressor section 12 can include a plurality of axially spaced stages. Each stage includes a set of circumferentially-spaced rotating blades and a set of circumferentially-spaced stationary vanes. The compressor blades for a stage of the compressor section 12 can be mounted to a disk, which is mounted to the drive shaft 18. Each set of blades for a given stage can have its own disk. The vanes of the compressor section 12 can be mounted to a shroud or casing, which can extend circumferentially about and enshroud one or more sections of the gas turbine engine 10. The representation of the compressor section 12 is merely schematic and there can be any number of blades, vanes, and compressor stages. Further, there can be any number of other components within the compressor section 12.

Similar to the compressor section 12, the turbine section 16 can include a plurality of axially spaced stages, with each stage having a set of circumferentially-spaced, rotating blades and a set of circumferentially-spaced, stationary vanes. The turbine blades for a stage of the turbine section 16 can be mounted to a disk which is mounted to the drive shaft 18. Each set of blades for a given stage can have its own disk. The vanes of the turbine section 16 can be mounted to the shroud or casing in a circumferential manner. There can be any number of blades, vanes, and turbine stages as the illustrated turbine section 16 is merely a schematic representation. There can be any number of other components within the turbine section 16.

The combustion section 14 can be provided serially between the compressor section 12 and the turbine section 16. The combustion section 14 can be fluidly coupled to at least a portion of the compressor section 12 and the turbine section 16 such that the combustion section 14 at least partially fluidly couples the compressor section 12 to the turbine section 16. As a non-limiting example, the combustion section 14 can be fluidly coupled to the HP compressor 24 at an upstream end of the combustion section 14 and to the HP turbine 26 at a downstream end of the combustion section 14. The combustion section 14 can include a combustor 30. In a non-limiting example, the combustor 30 can have a combination arrangement located with a shroud or casing 29 of the gas turbine engine 10. The shroud or casing 29 can enshroud or cover at least a portion of the combustion section 14.

During operation of the gas turbine engine 10, ambient or atmospheric air is drawn into the compressor section 12 via a fan (not illustrated) upstream of the compressor section 12, where the air is compressed defining a pressurized air. The pressurized air can then flow into the combustion section 14 where the pressurized air is mixed with fuel and ignited, thereby generating combustion gases. Some work is extracted from these combustion gases by the HP turbine 26, which drives the HP compressor 24. The combustion gases are discharged into the LP turbine 28, which extracts additional work to drive the LP compressor 22, and the exhaust gas is ultimately discharged from the gas turbine engine 10 via an exhaust section (not illustrated) downstream of the turbine section 16. The driving of the LP turbine 28 drives the LP spool to rotate the fan (not illustrated) and the LP compressor 22. The pressurized airflow and the combustion gases can together define a working airflow that flows through the fan, compressor section 12, combustion section 14, and turbine section 16 of the gas turbine engine 10. A combustion section centerline 33 of the combustion section 14 can be colinear with the rotational axis 20.

Figure 2:
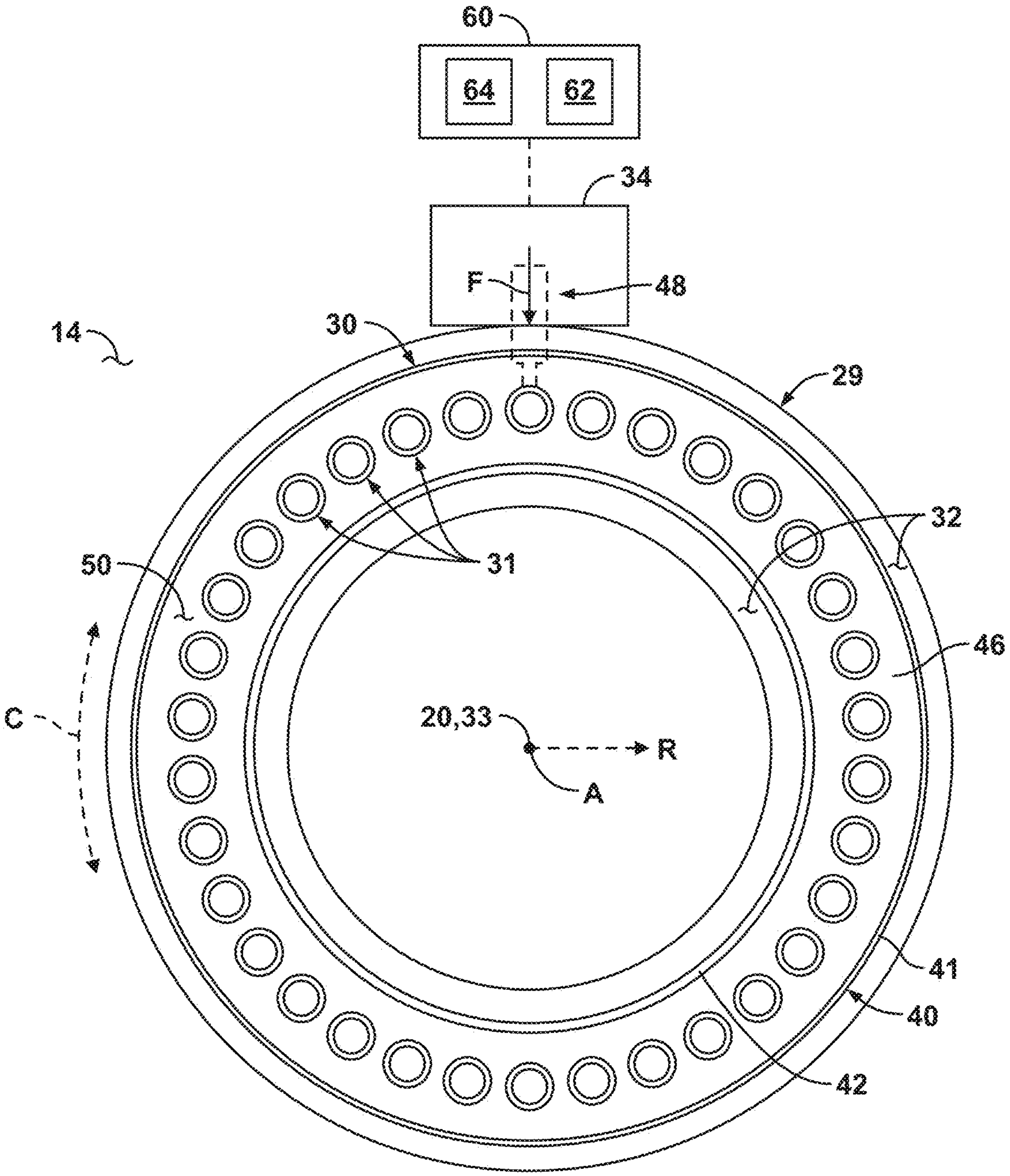
FIG. 2 is a schematic view of the combustion section of FIG. 1 along line II-II in accordance with various aspects described herein.

FIG. 2 depicts a cross-sectional view of the combustion section 14 along line II-II of FIG. 1. The combustion section 14 can include the combustor 30 with an annular arrangement of combustor portions 31 disposed around the centerline or rotational axis 20 of the gas turbine engine 10 (e.g., circumferentially spaced from each other in an annular configuration) (FIG. 1). The combustor portions 31 can, in some configurations, include or be configured as combustor cups, fuel cups, or nozzle cups. The combustor portions 31 can be arranged in an annular configuration about the rotational axis 20. A fuel-air mixer 48 can be connected to each combustor portion 31. The combustor 30 can have a can, can-annular, or annular arrangement depending on the type of engine in which the combustor 30 is located.

The combustor 30 can be at least partially defined by a combustor liner 40. In some examples, the combustor liner 40 can include an outer liner 41 and an inner liner 42 concentric with respect to each other and arranged in an annular fashion about the rotational axis 20. In some examples, the combustor liner 40 can have an annular structure at least partially defining the combustor 30. In some examples, the combustor liner 40 can include multiple segments or portions collectively forming the combustor liner 40. In some examples, the combustor liner 40 can include the outer liner 41 radially spaced from the inner liner 42. In some examples, the combustor liner 40 can include a single liner. The combustor portions 31 can be disposed at a radial distance from the rotational axis 20 that is greater than a radial distance of the inner liner 42 and less than a radial distance of the outer liner 41. The combustion section centerline 33 can define a radial direction R, an axial direction A, and a circumferential direction C.

The combustor liner 40 can at least partially define a combustion chamber 50 arranged annularly about the rotational axis 20. For example, a wall 46 (e.g., a dome wall) may be substantially perpendicular to the rotational axis 20 and can extend to the outer liner 41, the inner liner 42, or both, to at least partially define the combustion chamber 50. A compressed air passage 32 can be defined at least in part by both the combustor liner 40 and the casing 29.

The combustor 30 can include or be fluidly coupled to a fuel supply 34 (e.g., a fuel manifold or conduit) that supplies fuel F. The fuel-air mixer 48 fluidly couples the fuel supply 34 with one of the combustor portions 31 and the combustion chamber 50, such as to provide a mixture of fuel F and air 70 (FIG. 3) to the combustion chamber 50. The fuel-air mixer 48 can be coupled to the wall 46. Fuel F can include any suitable fuel, including liquid fuel, such as Jet-A, or gaseous fuel, such as hydrogen fuel, in non-limiting examples, which can include 100% $H_2$ (e.g., without diluents). A controller 60 can be connected to and at least partially control operation of the fuel supply 34, the fuel-air mixer 48, or combinations thereof. The controller 60 can include a processor 62 and a memory 64.

Figure 3:
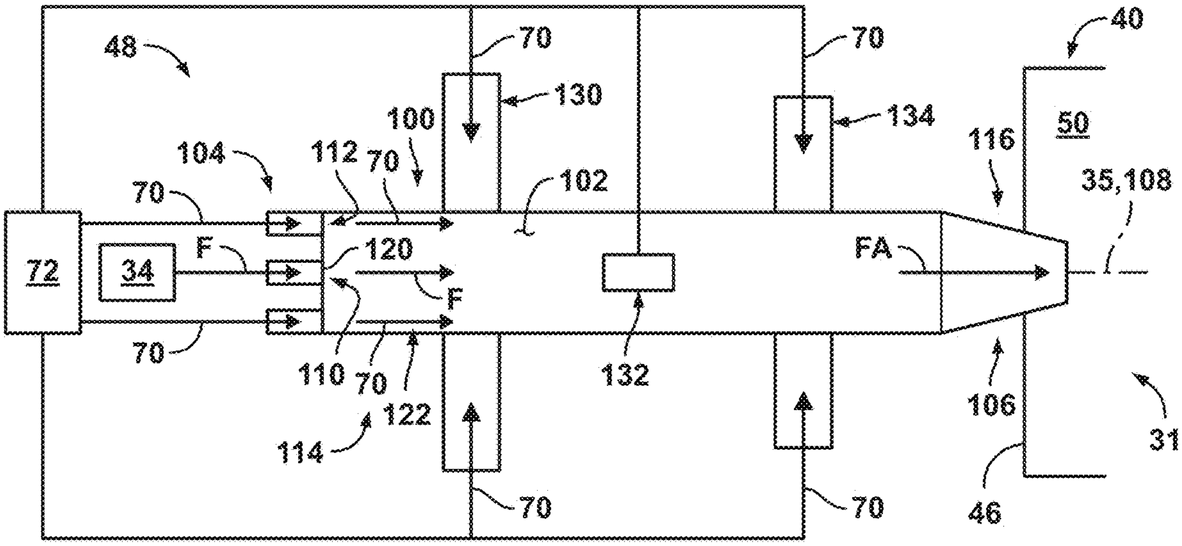
FIG. 3 is a schematic cross-sectional view illustrating portions of a fuel-air mixer fluidly coupled with a combustion chamber in accordance with various aspects described herein.

FIG. 3 is a cross-sectional schematic view of an example of one of the combustor portions 31 with the fuel-air mixer 48 coupled, directly or indirectly, to the wall 46 and the combustor liner 40. The fuel-air mixer 48 can include a fuel-air mixer centerline 35 that can be parallel with and radially offset from the combustion section centerline 33 (FIG. 2). The fuel-air mixer centerline 35 can be colinear with a centerline of the combustor portion 31 to which the fuel-air mixer 48 is coupled or part of.

The fuel-air mixer 48 can include a mixing tube 100 that defines a mixing channel 102. The mixing tube 100 defines a mixing tube inlet 104 fluidly coupled with the mixing channel 102, a mixing tube outlet 106 fluidly coupled with the mixing channel 102 and the combustion chamber 50, and a mixing channel centerline 108 that can be colinear with the fuel-air mixer centerline 35. The mixing tube inlet 104 can include a fuel inlet 110 and an air inlet 112. The mixing tube inlet 104, the fuel inlet 110, and the air inlet 112 are provided at an upstream end 114 of the mixing tube 100. The fuel inlet 110 is fluidly coupled with the fuel supply 34 to emit fuel F to the mixing channel 102. The fuel inlet 110 can comprise one or a plurality of orifices 120 (e.g., gaseous fuel orifices), which can be arranged in a circular or square pattern. The air inlet 112 is fluidly coupled with an air supply 72, which can include or be fluidly coupled with at least one of the compressor section 12 (FIG. 1) or the compressed air passage 32 (FIG. 2), to emit air 70 into the mixing channel 102. The air supply 72 can, for example, provide air 70 at a speed of at least 100 ft/s and less than or equal to 200 ft/s, which can be less than other designs that supply air closer to 400 ft/s. The air inlet 112 is arranged to emit air 70 into the mixing channel 102 to surround (e.g., envelop) fuel F emitted into the mixing channel 102 from the fuel inlet 110. For example, the air inlet 112 can emit air 70 to form an air envelope 122 in the mixing channel 102, and the fuel inlet 110 can emit fuel F (e.g., a flow of gaseous fuel) into the air envelope 122. The mixing tube outlet 106 can emit a fuel-air mixture FA of fuel F and air 70 from the mixing channel 102 into the combustion chamber 50.

The mixing tube 100 can include a first set of air jets 130 fluidly coupled with the air supply 72 and the mixing channel 102. The first set of air jets 130 can be axially spaced downstream of the mixing tube inlet 104. The mixing tube 100 can include a second set of air jets 132 fluidly coupled with the air supply 72 and the mixing channel 102. The second set of air jets 132 can be axially spaced downstream of the first set of air jets 130. The second set of air jets 132 can be circumferentially offset from the first set of air jets 130. The mixing tube 100 can include a third set of air jets 134 fluidly coupled with the air supply 72 and the mixing channel 102. The third set of air jets 134 can be axially spaced downstream of the second set of air jets 132. At least one of the first set of air jets 130, the second set of air jets 132, or the third set of air jets 134 can be tangentially arranged relative to the mixing channel centerline 108 to introduce a swirl to or increase the swirl of fuel F, air 70, or both fuel F and air 70 in the mixing channel 102. At least one other of the first set of air jets 130, the second set of air jets 132, or the third set of air jets 134 can be radially arranged relative to (e.g., directed at) the mixing channel centerline 108 to increase a spread of fuel F in the mixing channel 102. With some configurations, the first set of air jets 130 and the second set of air jets 132 can be arranged radially relative to the mixing channel centerline 108, and the third set of air jets 134 can be arranged tangentially relative to the mixing channel centerline 108.

The air inlet 112 and the sets of air jets 130, 132, 134 can provide a total air output of the fuel-air mixer 48. With some examples, the air inlet 112 can be configured to provide at least 10% and less than or equal to 20% of the total air output, the first set of air jets 130 can configured to provide at least 10% and less than or equal to 20% of the total air output, the second set of air jets 132 can be configured to provide at least 10% and less than or equal to 20% of the total air output, and the third set of air jets 134 can be configured to provide at least 40% and less than or equal to 70% of the total air output.

A downstream end 116 of the mixing tube 100, which includes the mixing tube outlet 106, can include a converging configuration to accelerate fluid flow (e.g., of the fuel-air mixture FA) in the mixing channel 102 toward the combustion chamber 50, which can limit flashback and flame holding.

Figure 4:
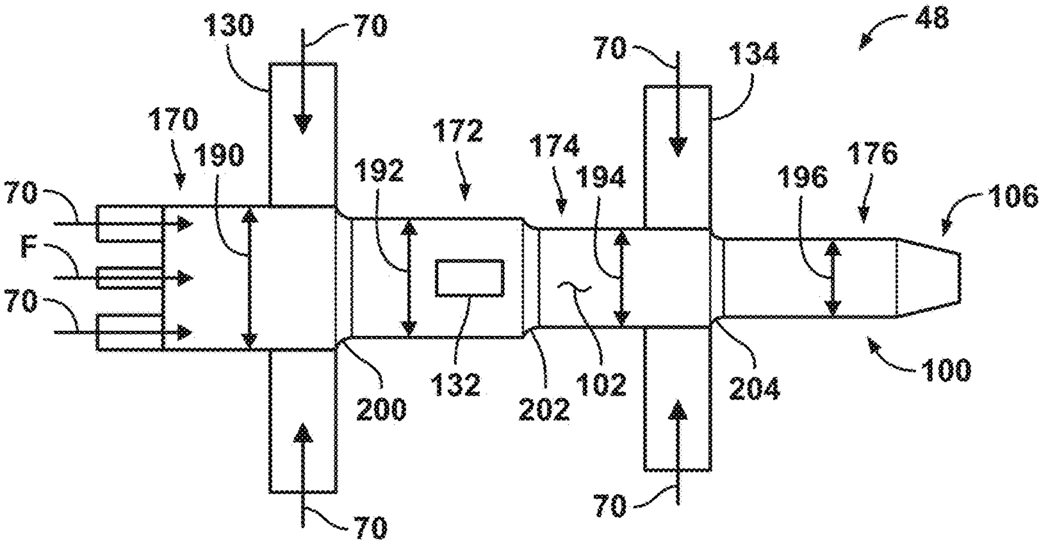
FIG. 4 is a schematic view illustrating portions of a fuel-air mixer in accordance with various aspects described herein.
Figure 5:
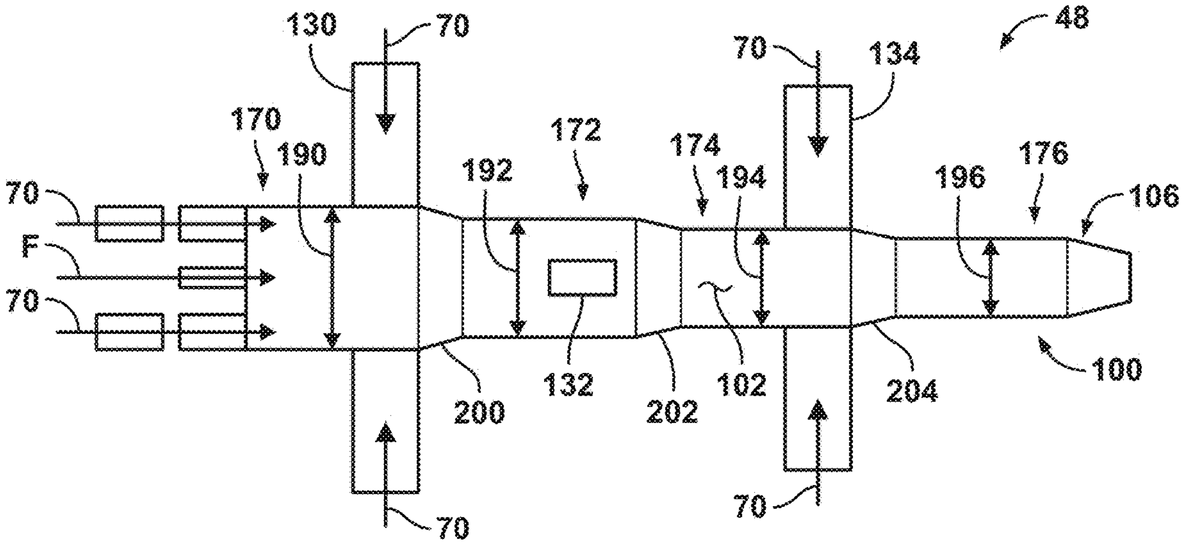
FIG. 5 is a schematic view illustrating portions of a fuel-air mixer in accordance with various aspects described herein.

Referring to FIGS. 4 and 5, the mixing channel 102 of the mixing tube 100 of the fuel-air mixer 48 can include a first section 170, which can have a first inner dimension 190 (e.g., a hydraulic diameter), a second section 172, which can have a second inner dimension 192 (e.g., a hydraulic diameter) smaller than the first inner dimension 190 and can be axially spaced downstream of the first section 170, a third section 174, which can have a third inner dimension 194 (e.g., a hydraulic diameter) smaller than the second inner dimension 192 and can be axially spaced downstream of the second section 172, a fourth section 176, which can have a fourth inner dimension 196 (e.g., a hydraulic diameter) smaller than the third inner dimension 194 and can be axially spaced downstream of the third section 174, or combinations thereof. The first set of air jets 130 can be fluidly coupled with the first section 170, the second set of air jets 132 can be fluidly coupled with the second section 172, the third set of air jets 134 can be fluidly coupled with the third section 174, or combinations thereof. In some examples, the fourth section 176 is devoid of air jets and is fluidly coupled with the mixing tube outlet 106.

The mixing channel 102 can comprise a first converging transition 200 between the first section 170 and the second section 172, a second converging transition 202 between the second section 172 and the third section 174, a third converging transition 204 between the third section 174 and the fourth section 176, or combinations thereof. The converging transitions 200, 202, 204 can transition from portions of the mixing channel 102 with larger inner dimensions to portions of the mixing channel 102 with smaller inner dimensions. At least one of the first converging transition 200, the second converging transition 202, or the third converging transition 204 can comprise a step (FIG. 4) or a ramp (FIG. 5). The step configuration (FIG. 4) can include aerodynamic blends. Converging transitions, such as the converging transitions 200, 202, 204, decrease a cross-sectional area of the mixing channel 102, which causes fluid in the mixing channel 102, such as fuel F and air 70, to accelerate, which can limit or flush away settlements or wakes generated via the set of air jets 130, 132, 134 upstream of the converging transitions 200, 202, 204, respectively, which can limit flashback and flame holding. Wakes can, for example, result in recirculation zones with low axial velocities, which can allow fuel F to settle and increase the possibility of flashback.

Figure 6:
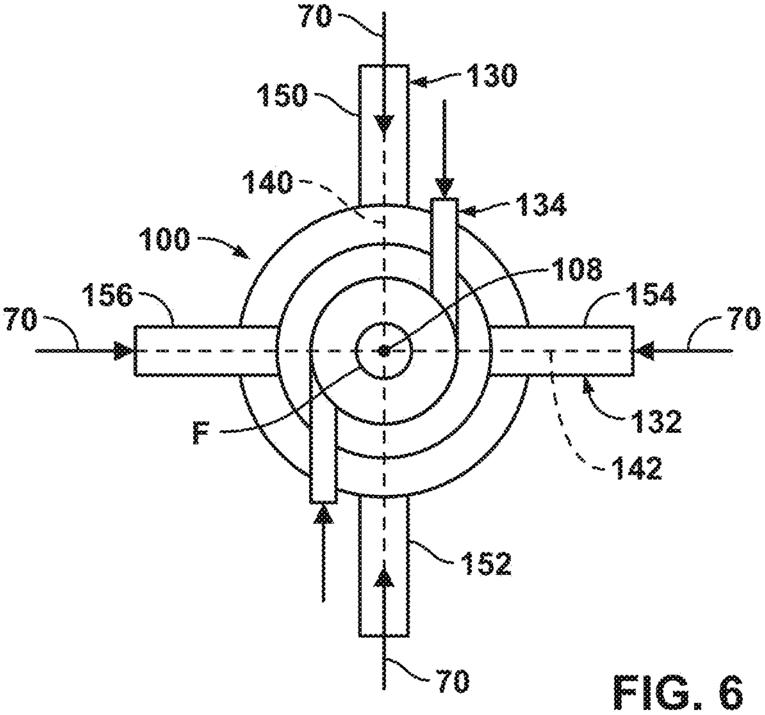
FIG. 6 is a schematic end view, viewed from aft, illustrating portions of a fuel-air mixer in accordance with various aspects described herein.

Referring to FIG. 6, the first set of air jets 130 and the second set of air jets 132 can be radially arranged relative to (e.g., directed toward) the mixing channel centerline 108. For example, axes 140 (e.g., central axes) of the first set of air jets 130 and axes 142 (e.g., central axes) of the second set of air jets 132 intersect with the mixing channel centerline 108. With such a configuration, air 70 emitted from the first set of air jets 130 and the second set of air jets 132 impinges on fuel F and air 70 in the mixing channel 102 to laterally spread fuel F (e.g., without imparting a rotation or swirl). In some examples, the first set of air jets 130 are circumferentially offset from the second set of air jets 132 by at least 60 degrees and less than or equal to 90 degrees.

The first set of air jets 130 can include at least two air jets, such as at least two air jets and less than or equal to six air jets. For example, the first set of air jets 130 can include a first air jet 150 and a second air jet 152 circumferentially offset from each other by 180 degrees. The second set of air jets 132 can include at least two air jets, such as at least two air jets and less than or equal to six air jets. For example, the second set of air jets 132 can include a third air jet 154 and a fourth air jet 156 circumferentially offset from each other by 180 degrees and from the first air jet 150 and the second air jet 152 by 90 degrees. The third set of air jets 134 can include at least two air jets, such as at least two and less than or equal to six air jets.

Figure 7:
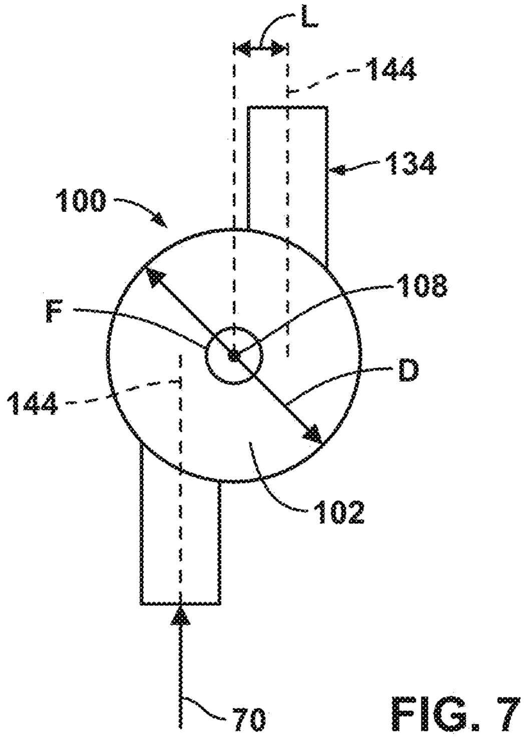
FIG. 7 is a schematic end view, viewed from aft, illustrating portions of a fuel-air mixer in accordance with various aspects described herein.

As illustrated in FIG. 7, the third set of air jets 134 can be tangentially arranged (e.g., offset from the mixing channel centerline 108). For example, axes 144 of the third set of air jets 134 can be offset by a lateral distance L from the mixing channel centerline 108 to impart tangential momentum to and swirl fuel F and air 70 in the mixing channel 102 of the mixing tube 100. The mixing channel 102 can include a diameter D. A ratio of the lateral distance L (e.g., an offset distance) to the diameter D can be greater than 0 and less than or equal to 0.5.

Figure 8A:
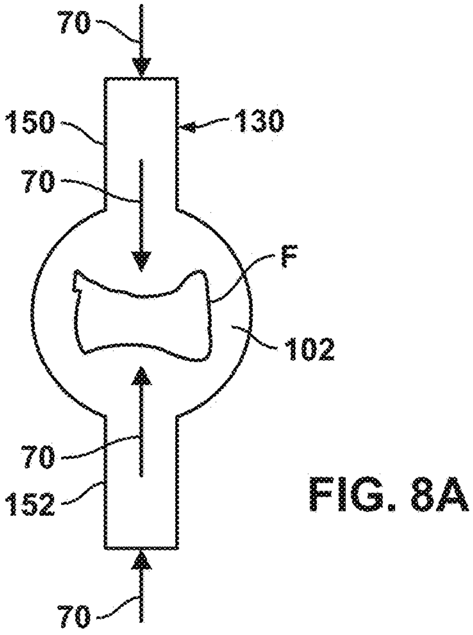
FIG. 8A is a schematic cross-sectional view illustrating portions of a fuel-air mixer at a first set of air jets in accordance with various aspects described herein.

Referring to FIG. 8A, the first set of air jets 130, such as the first air jet 150 and the second air jet 152, can be disposed in an opposing configuration to emit air 70 to laterally spread fuel F in the mixing channel 102 in a first lateral direction (e.g., left and right in FIG. 8A).

Figure 8B:
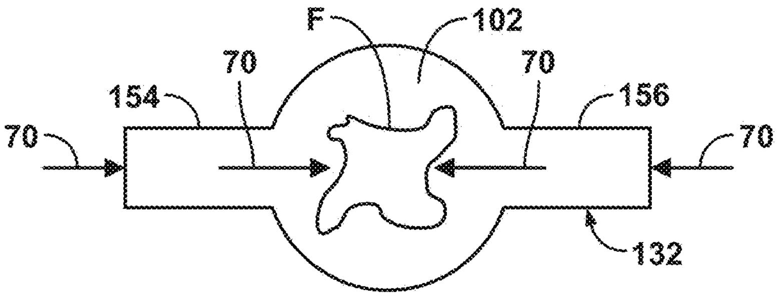
FIG. 8B is a schematic cross-sectional view illustrating portions of a fuel-air mixer at a second set of air jets in accordance with various aspects described herein.

Referring to FIG. 8B, the second set of air jets 132, such as the third air jet 154 and the fourth air jet 156, can be disposed in an opposing configuration to laterally spread fuel F in the mixing channel 102 (e.g., a gaseous fuel flow) in a second lateral direction (e.g., up and down in FIG. 8B). The second lateral direction can be different from the first lateral direction (FIG. 8A). For example, the second lateral direction can be orthogonal to the first lateral direction.

Figure 8C:
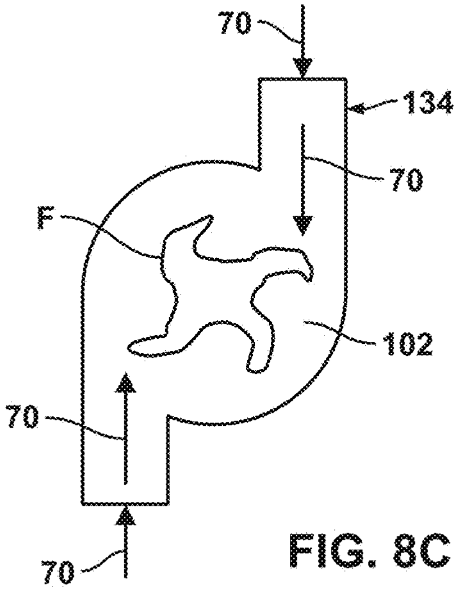
FIG. 8C is a schematic cross-sectional view illustrating portions of a fuel-air mixer at a third set of air jets in accordance with various aspects described herein.

Referring to FIG. 8C, the third set of air jets 134 can impart tangential momentum and swirl fuel F in the mixing channel 102, such as after fuel F is spread laterally in the first and second lateral directions via the first set of air jets 130 (FIG. 8A) and the second set of air jets 132 (FIG. 8B), which can provide circumferential mixing of fuel F and air 70, increase mixing of fuel F and air 70, or both.

Figure 9:
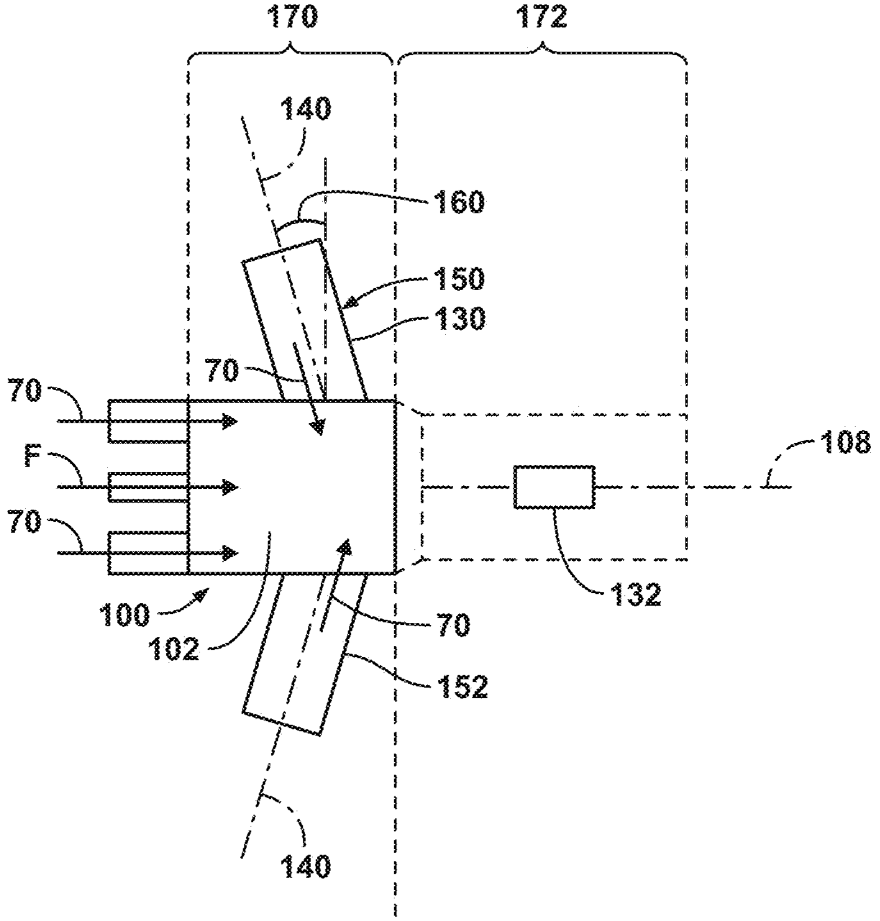
FIG. 9 is a schematic view illustrating portions of a fuel-air mixer at a first set of air jets in accordance with various aspects described herein.

In some configurations, such as generally illustrated in FIG. 3, the first set of air jets 130 can be radially arranged and perpendicular to the mixing channel centerline 108. In other configurations, such as generally illustrated in FIG. 9, axes 140 of the first set of air jets 130, such as the first air jet 150 and the second air jet 152, can be radially arranged and angled relative to perpendicular to the mixing channel centerline 108 (e.g., at an angle between 0 and 90 degrees) to impart rearward axial momentum to fuel F in the mixing channel 102. For example, an angle 160 of the axes 140 of the first set of air jets 130, relative to perpendicular to the mixing channel centerline 108, can be greater than 0 degrees and less than or equal to 85 degrees, with 0 degrees being perpendicular to the mixing channel centerline 108 and 90 degrees being parallel with the mixing channel centerline 108. The first section 170 and the second section 172 of the mixing tube 100 are illustrated, with the second section 172 shown in dashed lines to represent that the mixing channel 102 of the mixing tube 100 can include two sections, such as the first and second sections 170, 172, or more than two sections. Some sections or each section can include a segment of the mixing tube 100 and a respective set of air jets, such as the sets of air jets 130, 132, 134.

Figure 10A:
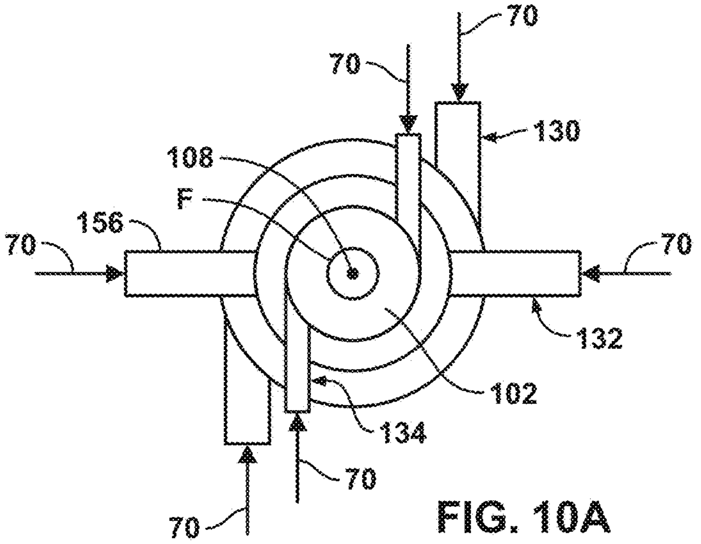
FIG. 10A is a schematic end view, viewed from aft, illustrating portions of a fuel-air mixer in accordance with various aspects described herein.

Referring to FIG. 10A, with some examples, the first set of air jets 130 and the third set of air jets 134 can be tangentially arranged relative to the mixing channel centerline 108, and the second set of air jets 132 can be radially arranged relative to the mixing channel centerline 108. With such a configuration, air 70 emitted by the first set of air jets 130 and the third set of air jets 134 can cause or increase swirling of fuel F, air 70, or both fuel F and air 70 in the mixing channel 102, and air 70 emitted by the second set of air jets 132 can laterally spread fuel F in the mixing channel 102. With such a configuration that includes two sets of tangentially arranged jets, the swirl introduced is increased, which can provide shorter, swirl stabilized flames and lower $NO_x$ emissions.

Figure 10B:
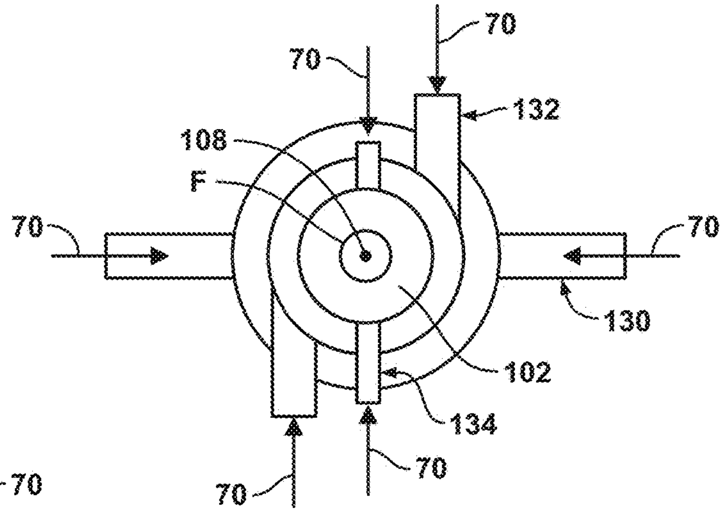
FIG. 10B is a schematic end view, viewed from aft, illustrating portions of a fuel-air mixer in accordance with various aspects described herein.
Figure 10C:
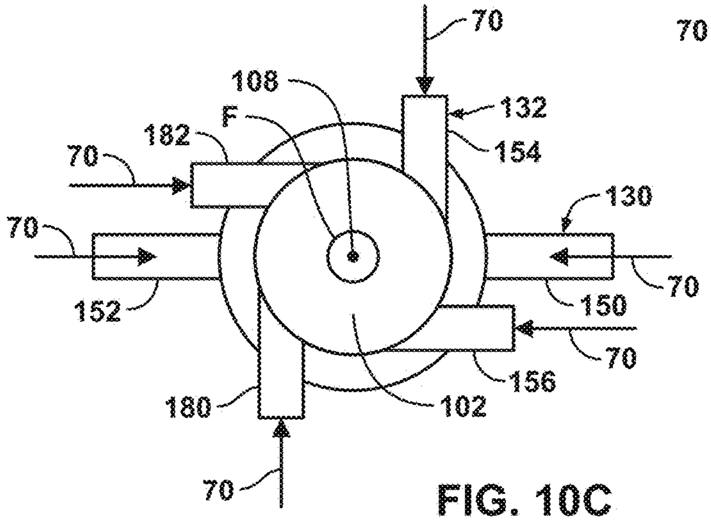
FIG. 10C is a schematic end view, viewed from aft, illustrating portions of a fuel-air mixer in accordance with various aspects described herein.

Referring to FIG. 10B, with some examples, the second set of air jets 132 are tangentially arranged, and the first set of air jets 130 and the third set of air jets 134 are radially arranged. With such a configuration, air 70 emitted by the first set of air jets 130 and the third set of air jets 134 can laterally spread fuel F in the mixing channel 102, and air 70 emitted by the second set of air jets 132 can cause or increase swirling of fuel F, air 70, or both fuel F and air 70 in the mixing channel 102. Configurations with more sets of radial jets can provide increased lateral spread of fuel F, which can provide more uniform temperature distribution and lower maximum temperatures, limiting $NO_x$ emissions Referring to FIG. 10C, with some examples, the first set of air jets 130 can be radially arranged relative to the mixing channel centerline 108 to increase a spread of fuel F in the mixing channel 102, and the second set of air jets 132 can be tangentially arranged relative to the mixing channel centerline 108 to introduce or increase a swirl of fuel F and air 70 in the mixing channel 102. The second set of air jets 132 can comprise more air jets than the first set of air jets 130. For example, the first set of air jets 130 can comprise two air jets, such as the first and second air jets 150, 152, and the second set of air jets 132 can comprise four air jets, such as the third air jet 154, the fourth air jet 156, a fifth air jet 180, and a sixth air jet 182. Air jets of a set, such as the first and second sets of air jets 130, 132, can have the same axial positioning along the mixing channel 102. The third set of air jets 134 (FIG. 10A) may be omitted. Such a configuration that utilizes two sets of air jets (e.g., instead of three or more) can reduce the mixing length, which can reduce the possibility of autoignition.

Figure 11:
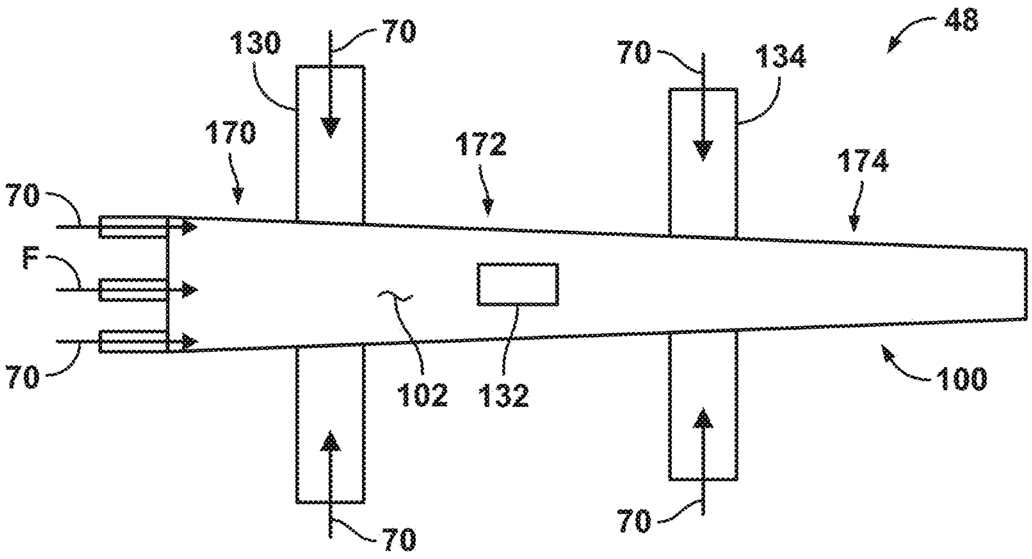
FIG. 11 is a schematic view illustrating portions of a fuel-air mixer in accordance with various aspects described herein.

Referring to FIG. 11, the mixing channel 102 of the mixing tube 100 of the fuel-air mixer 48 can receive air 70 and fuel F, and include a continuously converging configuration, such as extending from the first section 170 through second section 172 and the third section 174 and instead of including the converging transitions 200, 202, 204 of FIGS. 4 and 5. Such a continuously converging configuration continues to increase fluid velocity in the mixing channel 102 to limit or flush away settlements or wakes generated via the sets of air jets 130, 132, 134, which can limit flashback and flame holding.

Figure 12:
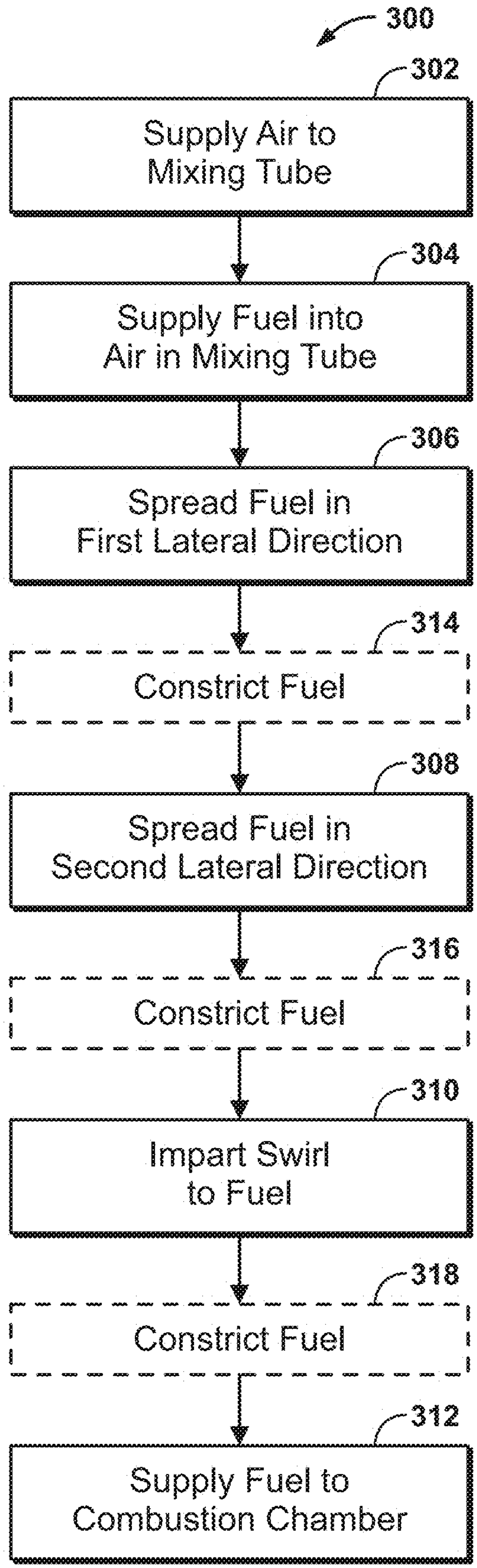
FIG. 12 is a flow diagram illustrating a method of operating a gas turbine engine in accordance with various aspects described herein.

Referring to FIG. 12, a method 300 of operating a gas turbine engine is illustrated. The method 300 can be utilized with the gas turbine engine 10 and components thereof, such as generally illustrated in FIGS. 1-11. The method 300 can include supplying air 70 (e.g., compressed air) from the air supply 72 to the mixing tube 100 of the fuel-air mixer 48 of the combustion section 14 (block 302). The method 300 can include supplying fuel F (e.g., a flow of gaseous fuel) into air 70 in the mixing tube 100 (block 304), such as into the mixing channel 102. The method 300 can include laterally spreading fuel F in the mixing tube 100 in the first lateral direction (block 306), such as via supplying air 70 to the mixing tube 100 through the first set of air jets 130, and laterally spreading fuel F in the mixing tube 100 in the second lateral direction, which is different from the first lateral direction (block 308), such as via supplying air 70 to the mixing tube 100 through the second set of air jets 132. The method 300 can include imparting a swirl to fuel F in the mixing tube 100 (block 310), such as via supplying air 70 to the mixing tube 100 through the third set of air jets 134. The method 300 can include supplying the swirled and laterally spread fuel F to the combustion chamber 50 of the combustion section 14 (block 312). Optionally, the method 300 can include constricting fuel F in the mixing tube 100, such as (i) after laterally spreading fuel F in the first lateral direction in block 306 and before laterally spreading fuel F in the second lateral direction in block 308 (block 314), (ii) after laterally spreading fuel F in the second lateral direction in block 308 and before imparting the swirl in block 310 (block 316), (iii) after imparting the swirl in block 310 (block 318), or combinations thereof.

While described with respect to a turbine engine, it should be appreciated that the combustor and fuel-air mixer as described herein can be for any engine having a combustor. It should be appreciated that application of aspects of the disclosure discussed herein are applicable to engines with propeller sections or fan and booster sections along with turbojets and turbo engines as well.

To the extent not already described, the different features and structures of the various embodiments can be used in combination, or in substitution with each other as desired. That one feature is not illustrated in all of the embodiments is not meant to be construed that it cannot be so illustrated but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or systems and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

A gas turbine engine, comprising: a compressor section, a combustion section, and a turbine section in a serial flow arrangement, with the combustion section comprising: a combustor liner that at least partially defines a combustion chamber; and a fuel-air mixer fluidly coupled with the combustion chamber and comprising: a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air; a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets; wherein at least one of the first set of air jets, the second set of air jets, or the third set of air jets is tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel.

The gas turbine engine of any preceding clause, wherein the first set of air jets and the second set of air jets are directed toward the mixing channel centerline; and wherein the third set of air jets are offset by a lateral distance from the mixing channel centerline.

The gas turbine engine of any preceding clause, wherein the first set of air jets are circumferentially offset from the second set of air jets by at least 60 degrees and less than or equal to 90 degrees.

The gas turbine engine of any preceding clause, wherein the first set of air jets includes a first air jet and a second air jet circumferentially offset from each other by 180 degrees; and wherein the second set of air jets includes a third air jet and a fourth air jet circumferentially offset from each other by 180 degrees and from the first air jet and the second air jet by 90 degrees.

The gas turbine engine of any preceding clause, wherein the first air jet and the second air jet are perpendicular to the mixing channel centerline.

The gas turbine engine of any preceding clause, wherein the air inlet is configured to provide at least 10% and less than or equal to 20% of a total air output of the fuel-air mixer; wherein the first set of air jets are configured to provide at least 10% and less than or equal to 20% of the total air output of the fuel-air mixer; wherein the second set of air jets are configured to provide at least 10% and less than or equal to 20% of the total air output of the fuel-air mixer; and wherein the third set of air jets are configured to provide at least 40% and less than or equal to 70% of the total air output of the fuel-air mixer.

The gas turbine engine of any preceding clause, wherein the mixing channel includes a first section having a first inner dimension, a second section having a second inner dimension smaller than the first inner dimension and axially spaced downstream of the first section, and a third section having a third inner dimension smaller than the second inner dimension and axially spaced downstream of the second section.

The gas turbine engine of any preceding clause, wherein the first set of air jets are fluidly coupled with the first section, the second set of air jets are fluidly coupled with the second section, and the third set of air jets are fluidly coupled with the third section.

The gas turbine engine of any preceding clause, wherein the mixing channel comprises a first converging transition between the first section and the second section, and a second converging transition between the second section and the third section.

The gas turbine engine of any preceding clause, wherein at least one of the first converging transition or the second converging transition comprises a step or a ramp.

The gas turbine engine of any preceding clause, wherein the mixing channel comprises a fourth section downstream of the third section; and the mixing channel includes a third converging transition between the third section and the fourth section.

The gas turbine engine of any preceding clause, wherein the first converging transition is configured to accelerate fluid flow in the mixing channel to limit wakes generated by the first set of air jets.

The gas turbine engine of any preceding clause, wherein the mixing channel includes a continuously converging configuration.

The gas turbine engine of any preceding clause, wherein the first set of air jets and the third set of air jets are arranged tangentially relative to the mixing channel centerline; and wherein the second set of air jets are arranged radially relative to the mixing channel centerline.

The gas turbine engine of any preceding clause, wherein the first set of air jets and the second set of air jets are arranged radially relative to the mixing channel centerline; and wherein the third set of air jets are arranged tangentially relative to the mixing channel centerline.

The gas turbine engine of any preceding clause, wherein the air inlet is fluidly coupled with an air supply configured to provide the air with a speed of at least 100 ft/s and less than or equal to 200 ft/s.

A method of operating a gas turbine engine having a compressor section, combustion section, and turbine section in a serial flow arrangement, the method comprising: supplying compressed air from the compressor section to a mixing tube of the combustion section; supplying a flow of gaseous fuel into the compressed air in the mixing tube; laterally spreading the flow of gaseous fuel in a first lateral direction; laterally spreading the flow of gaseous fuel in a second lateral direction, which is different from the first lateral direction; imparting a swirl to the flow of gaseous fuel; and supplying the swirled and laterally spread flow of gaseous fuel to a combustion chamber of the combustion section.

The method of any preceding clause, wherein the lateral spreading of the flow of gaseous fuel in the first lateral direction is conducted via supplying air to the mixing tube via a first set of air jets; and wherein the lateral spreading of the flow of gaseous fuel in the second lateral direction is conducted via supplying air to a second set of air jets axially and circumferentially offset from the first set of air jets.

The method of any preceding clause, wherein the imparting the swirl to the flow of gaseous fuel is conducted via supplying air to a third set of air jets axially offset from the first set of air jets and the second set of air jets.

The method of any preceding clause, further comprising constricting the flow of gaseous fuel after laterally spreading the flow of gaseous fuel in the first lateral direction and before laterally spreading the flow of gaseous fuel in the second lateral direction.

A gas turbine engine, comprising: a compressor section, a combustion section, and a turbine section in a serial flow arrangement, with the combustion section comprising: a combustor liner that at least partially defines a combustion chamber; and a fuel-air mixer fluidly coupled with the combustion chamber, the fuel-air mixer comprising: a mixing tube defining a mixing channel; an air inlet at an upstream end of the mixing tube to form an air envelope in the mixing tube; a fuel inlet at the upstream end of the mixing tube to emit a flow of gaseous fuel flow into the air envelope; a first set of opposing air jets to spread the gaseous fuel flow in a first lateral direction; a second set of opposing air jets to spread the gaseous fuel flow in a second lateral direction, which is orthogonal to the first lateral direction; and a set of tangential air jets imparting a swirl to the gaseous fuel flow.

A gas turbine engine, comprising: a compressor section, a combustion section, and a turbine section in a serial flow arrangement, with the combustion section comprising: a combustor liner that at least partially defines a combustion chamber; and a fuel-air mixer fluidly coupled with the combustion chamber and comprising: a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air; a first set of air jets fluidly coupled with the mixing channel and axially spaced downstream of the mixing tube inlet; and a second set of air jets fluidly coupled with the mixing channel and axially spaced downstream of the first set of air jets; wherein the second set of air jets is tangentially arranged relative to the mixing channel centerline to introduce or increase a swirl of fuel and air in the mixing channel, and the first set of air jets is radially arranged relative to the mixing channel centerline to increase a spread of fuel in the mixing channel.

The gas turbine engine of any preceding clause, wherein the air inlet is arranged to emit the air to surround the fuel from the fuel inlet.

The gas turbine engine of any preceding clause, wherein a downstream end of the mixing tube includes a converging configuration to accelerate fluid flow in the mixing channel and limit flashback and flame holding.

The gas turbine engine of any preceding clause, wherein the fuel inlet comprises a plurality of orifices arranged in a circular or square pattern.

The gas turbine engine of any preceding clause, wherein axes of the first set of air jets intersect with the mixing tube centerline.

The gas turbine engine of any preceding clause wherein the first set of air jets includes at least two air jets and less than or equal to six air jets.

The gas turbine engine of any preceding clause wherein the second set of air jets includes at least two air jets and less than or equal to six air jets.

The gas turbine engine of any preceding clause wherein the third set of air jets includes at least two air jets and less than or equal to six air jets.

The gas turbine engine of any preceding clause, wherein the axes of the first set of air jets are angled relative to a radial direction to impart axial momentum to the fuel in the mixing channel.

The gas turbine engine of any preceding clause, wherein an angle of the axes of the first set of air jets is greater than 0 degrees, which is parallel to the radial direction, and less than or equal to 85 degrees.

The gas turbine engine of any preceding clause, wherein the axes of the third set of air jets are offset from the mixing tube centerline to impart tangential momentum to and swirl the fuel and air in the mixing tube.

The gas turbine engine of any preceding clause, wherein a ratio of an offset distance of the offset to a diameter of the mixing tube is greater than 0 and less than or equal to 0.5.

The gas turbine engine of any preceding clause, wherein the second set of air jets are tangentially arranged, and the first set of air jets and the third set of air jets are radially arranged.

The gas turbine engine of any preceding clause, wherein the second set of air jets comprises more air jets than the first set of air jets.

The gas turbine engine of any preceding clause, wherein the second set of air jets comprises four air jets and the first set of air jets comprises two air jets.

The gas turbine engine of any preceding clause, wherein the first converging transition is configured to accelerate fluid flow in the mixing channel to limit wakes generated by the first set of air jets.

The gas turbine engine of any preceding clause, wherein the second converging transition is configured to accelerate fluid flow in the mixing channel to limit wakes generated by the second set of air jets.

The gas turbine engine of any preceding clause, wherein the third converging transition is configured to accelerate fluid flow in the mixing channel to limit wakes generated by the third set of air jets.

The gas turbine engine of any preceding clause, wherein the mixing tube comprises a continuously converging configuration.

A fuel-air mixer for a combustion section of a gas turbine engine, the fuel-air mixer comprising: a mixing tube defining a mixing channel including a mixing tube inlet, a mixing tube outlet, and a mixing channel centerline, the mixing tube inlet including a fuel inlet to receive fuel and an air inlet to receive air; a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets; wherein at least one of the first set of air jets, the second set of air jets, or the third set of air jets are tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel.

The fuel-air mixer of any preceding clause, wherein the first set of air jets and the second set of air jets are directed toward the mixing channel centerline; and wherein the third set of air jets are offset from the mixing channel centerline.

The fuel-air mixer of any preceding clause, wherein the first set of air jets are circumferentially offset from the second set of air jets by at least 60 degrees and less than or equal to 90 degrees.

The fuel-air mixer of any preceding clause, wherein the first set of air jets includes a first air jet and a second air jet circumferentially offset from each other by 180 degrees; and wherein the second set of air jets includes a third air jet and a fourth air jet circumferentially offset from each other by 180 degrees and from the first air jet and the second air jet by 90 degrees.

The fuel-air mixer of any preceding clause, wherein the first air jet and the second air jet are perpendicular to the mixing channel centerline.

The fuel-air mixer of any preceding clause, wherein the air inlet is configured to provide at least 10% and less than or equal to 20% of a total air output of the fuel-air mixer; wherein the first set of air jets are configured to provide at least 10% and less than or equal to 20% of the total air output of the fuel-air mixer; wherein the second set of air jets are configured to provide at least 10% and less than or equal to 20% of the total air output of the fuel-air mixer; and wherein the third set of air jets are configured to provide at least 40% and less than or equal to 70% of the total air output of the fuel-air mixer.

The fuel-air mixer of any preceding clause, wherein the mixing channel includes a first section having a first inner dimension, a second section having a second inner dimension smaller than the first inner dimension and axially spaced downstream of the first section, and a third section having a third inner dimension smaller than the second inner dimension and axially spaced downstream of the second section.

The fuel-air mixer of any preceding clause, wherein the first set of air jets are fluidly coupled with the first section, the second set of air jets are fluidly coupled with the second section, and the third set of air jets are fluidly coupled with the third section.

The fuel-air mixer of any preceding clause, wherein the mixing channel comprises a first converging transition between the first section and the second section, and a second converging transition between the second section and the third section.

The fuel-air mixer of any preceding clause, wherein at least one of the first converging transition or the second converging transition comprises a step or a ramp.

The fuel-air mixer of any preceding clause, wherein the mixing channel comprises a fourth section downstream of the third section; and the mixing channel includes a third converging transition between the third section and the fourth section.

The fuel-air mixer of any preceding clause, wherein the first converging transition is configured to accelerate fluid flow in the mixing channel to limit wakes generated by the first set of air jets.

The fuel-air mixer of any preceding clause, wherein the mixing channel includes a continuously converging configuration extending from the first section through the third section.

The fuel-air mixer of any preceding clause, wherein the first set of air jets and the third set of air jets are arranged tangentially relative to the mixing channel centerline; and wherein the second set of air jets are arranged radially relative to the mixing channel centerline.

The fuel-air mixer of any preceding clause, wherein the first set of air jets and the second set of air jets are arranged radially relative to the mixing channel centerline; and wherein the third set of air jets are arranged tangentially relative to the mixing channel centerline.

An electronic controller configured to implement the method of any preceding clause.

An electronic controller configured to control operation of the gas turbine engine of any preceding clause.

An electronic controller configured to control operation of the fuel-air mixer of any preceding clause.

The electronic controller of any preceding clause, comprising a processor and a memory.

What is claimed is:

1. A gas turbine engine, comprising:

a compressor section, a combustion section, and a turbine section in a serial flow arrangement, with the combustion section comprising:

a combustor liner that at least partially defines a combustion chamber; and a fuel-air mixer configured to mix gaseous fuel including hydrogen fuel and being fluidly coupled with the combustion chamber, the fuel-air mixer comprising:

a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air;

a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets;

wherein at least one of the first set of air jets, the second set of air jets, or the third set of air jets is tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel, wherein the air inlet is configured to provide at least 10% and less than or equal to 20% of a total air output of the fuel-air mixer, wherein the first set of air jets are configured to provide at least 10% and less than or equal to 20% of the total air output of the fuel-air mixer, wherein the second set of air jets are configured to provide at least 10% and less than or equal to 20% of the total air output of the fuel-air mixer, and wherein the third set of air jets are configured to provide at least 40% and less than or equal to 70% of the total air output of the fuel-air mixer.

2. The gas turbine engine of claim 1, wherein the first set of air jets and the second set of air jets are directed toward the mixing channel centerline; and wherein the third set of air jets are offset by a lateral distance from the mixing channel centerline.

3. The gas turbine engine of claim 1, wherein the mixing channel includes a continuously converging configuration.

4. The gas turbine engine of claim 1, wherein the first set of air jets and the third set of air jets are arranged tangentially relative to the mixing channel centerline; and wherein the second set of air jets are arranged radially relative to the mixing channel centerline.

5. The gas turbine engine of claim 1, wherein the first set of air jets and the second set of air jets are arranged radially relative to the mixing channel centerline; and wherein the third set of air jets are arranged tangentially relative to the mixing channel centerline.

6. A gas turbine engine, comprising:

a compressor section, a combustion section, and a turbine section in a serial flow arrangement, with the combustion section comprising:

a combustor liner that at least partially defines a combustion chamber; and a fuel-air mixer configured to mix gaseous fuel including hydrogen fuel and being fluidly coupled with the combustion chamber, the fuel-air mixer comprising:

a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air;

a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets;

wherein at least one of the first set of air jets, the second set of air jets, or the third set of air jets is tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel, and wherein the first set of air jets are circumferentially offset from the second set of air jets by at least 60 degrees and less than or equal to 90 degrees.

7. The gas turbine engine of claim 6, wherein the first set of air jets includes a first air jet and a second air jet circumferentially offset from each other by 180 degrees; and wherein the second set of air jets includes a third air jet and a fourth air jet circumferentially offset from each other by 180 degrees and from the first air jet and the second air jet by 90 degrees.

8. The gas turbine engine of claim 7, wherein the first air jet and the second air jet are perpendicular to the mixing channel centerline.

9. A gas turbine engine, comprising:

a compressor section, a combustion section, and a turbine section in a serial flow arrangement, with the combustion section comprising:

a combustor liner that at least partially defines a combustion chamber; and a fuel-air mixer fluidly coupled with the combustion chamber and comprising:

a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air, wherein the mixing channel includes a first section having a first inner dimension, a second section having a second inner dimension smaller than the first inner dimension and axially spaced downstream of the first section, and a third section having a third inner dimension smaller than the second inner dimension and axially spaced downstream of the second section;

a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets;

wherein at least one of the first set of air jets, the second set of air jets, or the third set of air jets is tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel.

10. The gas turbine engine of claim 9, wherein the first set of air jets are fluidly coupled with the first section, the second set of air jets are fluidly coupled with the second section, and the third set of air jets are fluidly coupled with the third section.

11. The gas turbine engine of claim 10, wherein the mixing channel comprises a first converging transition between the first section and the second section, and a second converging transition between the second section and the third section.

12. The gas turbine engine of claim 11, wherein at least one of the first converging transition or the second converging transition comprises a step or a ramp.

13. The gas turbine engine of claim 11, wherein the mixing channel comprises a fourth section downstream of the third section; and the mixing channel includes a third converging transition between the third section and the fourth section.

14. The gas turbine engine of claim 11, wherein the first converging transition is configured to accelerate fluid flow in the mixing channel to limit wakes generated by the first set of air jets.

15. A gas turbine engine, comprising:

a compressor section, a combustion section, and a turbine section in a serial flow arrangement, with the combustion section comprising:

a combustor liner that at least partially defines a combustion chamber; and a fuel-air mixer configured to mix gaseous fuel including hydrogen fuel and being fluidly coupled with the combustion chamber, the fuel-air mixer comprising:

a mixing tube defining a mixing channel including a mixing tube inlet, a mixing tube outlet fluidly coupled with the combustion chamber, and a mixing channel centerline, the mixing tube inlet including a fuel inlet to receive fuel and an air inlet to receive air;

a first set of air jets fluidly coupled with the mixing channel and axially spaced downstream of the mixing tube inlet; and a second set of air jets fluidly coupled with the mixing channel and axially spaced downstream of the first set of air jets, the second set of air jets circumferentially offset from the first set of air jets; and a third set of air jets fluidly coupled with the mixing channel and axially spaced downstream of the second set of air jets;

wherein at least one of the first set of air jets, the second set of air jets, or the third set of air jets is tangentially arranged relative to the mixing channel centerline to introduce or increase a swirl of fuel and air in the mixing channel, and at least one other of the first set of air jets, the second set of air jets, or the third set of air jets are radially arranged relative to the mixing channel centerline to increase a spread of fuel in the mixing channel, and wherein the air inlet is fluidly coupled with an air supply configured to provide the air with a speed of at least 100 ft/s and less than or equal to 200 ft/s.

16. A method of operating a gas turbine engine having a compressor section, a combustion section, and a turbine section in a serial flow arrangement, the method comprising:

supplying compressed air from the compressor section to a mixing tube of the combustion section;

supplying a flow of gaseous fuel into the compressed air in the mixing tube;

laterally spreading the flow of gaseous fuel in a first lateral direction;

laterally spreading the flow of gaseous fuel in a second lateral direction, which is different from the first lateral direction;

imparting a swirl to the flow of gaseous fuel;

supplying the swirled and laterally spread flow of gaseous fuel to a combustion chamber of the combustion section; and constricting the flow of gaseous fuel after laterally spreading the flow of gaseous fuel in the first lateral direction and before laterally spreading the flow of gaseous fuel in the second lateral direction.

17. The method of claim 16, wherein the lateral spreading of the flow of gaseous fuel in the first lateral direction is conducted via supplying air to the mixing tube via a first set of air jets; and wherein the lateral spreading of the flow of gaseous fuel in the second lateral direction is conducted via supplying air to a second set of air jets axially and circumferentially offset from the first set of air jets.

18. The method of claim 17, wherein the imparting the swirl to the flow of gaseous fuel is conducted via supplying air to a third set of air jets axially offset from the first set of air jets and the second set of air jets.

* * * * *